(12) United States Patent
Fritsch et al.

(10) Patent No.: US 6,405,752 B1
(45) Date of Patent: Jun. 18, 2002

(54) SOLENOID VALVE FOR A SLIP-CONTROLLED HYDRAULIC BRAKE SYSTEM OF A VEHICLE

(75) Inventors: Siegfried Fritsch, Sonthofen; Martin Kirschner, Rettenberg; Peter Zimmermann, Sonthofen-Alstaedten, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,647
(22) PCT Filed: Nov. 18, 1998
(86) PCT No.: PCT/DE98/03400
§ 371 (c)(1), (2), (4) Date: Nov. 3, 2000
(87) PCT Pub. No.: WO66/42348
PCT Pub. Date: Aug. 26, 1999

(30) Foreign Application Priority Data
Feb. 20, 1998 (DE) .......................... 198 07 130

(51) Int. Cl.⁷ ........................... F16K 31/06; B60T 8/36
(52) U.S. Cl. .................................. 137/550; 251/129.15
(58) Field of Search ............. 251/129.15, 129.01, 251/129.14; 303/119.2; 137/549, 550

(56) References Cited

U.S. PATENT DOCUMENTS

| 5,232,196 A | * | 8/1993 | Hutchings et al. .. 251/129.15 X |
| 5,791,747 A | * | 8/1998 | Sorensen et al. ... 251/129.15 X |
| 6,050,542 A | * | 4/2000 | Johnson et al. ........ 251/129.15 |
| 6,254,199 B1 | * | 7/2001 | Megerle et al. ......... 137/550 X |

* cited by examiner

Primary Examiner—Kevin Lee
(74) Attorney, Agent, or Firm—Ronald E. Greigg

(57) ABSTRACT

A solenoid valve with a valve dome in which an armature is contained in an axially movable fashion and onto which a coil is slid for actuating the solenoid valve. In order to mechanically fasten and seal the solenoid valve in a receiving bore of a hydraulic block. A valve seat part is inserted into an open end of the valve dome and an annular ring-shaped valve support is press fitted onto the open end of the valve dome so that the valve seat part, the valve dome, and the valve support are mechanically connected to one another and are sealed in a pressure-tight fashion. The solenoid valve is easy-to-manufacture and is sealed without separate seals.

11 Claims, 2 Drawing Sheets

SOLENOID VALVE FOR A SLIP-CONTROLLED HYDRAULIC BRAKE SYSTEM OF A VEHICLE

PRIOR ART

The invention is based on a solenoid valve which is provided for insertion into a receiving bore in a hydraulic block of a slip-controlled hydraulic brake system of a vehicle. In particular, the solenoid valve is provided as a wheel brake pressure reduction valve that is connected to a wheel brake cylinder and is disposed between the wheel brake cylinder and a suction side of a return feed pump.

A solenoid valve of this kind has been disclosed by DE 197 00 495 A1. In this solenoid valve, the tubular valve dome is equipped at an open end with a hollow conical or annular step-shaped enlarged section with which it engages around a fittingly embodied collar of the valve support. The valve dome and the valve support are fastened in the receiving bore of the hydraulic block by means of a first caulk, which is formed out of the material of the hydraulic block and engages the enlarged section of the valve dome. The valve dome also has an annular component slid onto the valve dome and supported against the first caulk, which is fastened in the receiving bore at a mouth end by means of a second caulking of the hydraulic block. The sleeve-shaped valve support is of one piece with a valve seat which is engaged by an armature-actuated valve closing body and is provided with a cup point at the bottom which digs into the material of the hydraulic block at the bottom of the receiving bore and divides a valve inlet extending radially in the hydraulic block and in the valve support from an axially extending valve outlet of the hydraulic block. The caulks and the cup point seal eliminate the need for elastomer sealing elements. But the assembly of the solenoid valve is relatively costly due to the successively produced caulks.

U.S. Pat. No. 4,610,428 has disclosed a solenoid valve with a valve dome which has an annular step-shaped enlarged section at an open end. This enlarged section rests in a complementary step of a shaped sheet metal part serving as a valve support. With the interposition of a sealing ring, a collar of a valve seat part disposed in the valve dome engages in the annular step-shaped enlarged section of the valve dome. The valve support is not subjected to any stress by a fluid and therefore does not fulfill any sealing function. It merely serves to fasten the solenoid valve to the outside of a valve block.

A solenoid valve disclosed by U.S. Pat. No. 5,423,602 has an undercut-free valve support into which a valve seat part is press-fitted. A projection formed onto the valve support remote from the valve seat part is encompassed in a fluid-tight fashion by the open end of a valve dome.

Furthermore, DE 40 30 971 A1 has disclosed a solenoid valve with a valve support, which has a projection that is encompassed by the open end of a valve dome and is welded to this valve dome in a fluid-tight fashion.

A solenoid valve disclosed by EP 0 675 030 A2 has a hollow cylindrical valve dome into which a cylindrical pole is inserted and in which an armature is contained in an axially movable fashion. A coil is placed onto the valve dome in order to actuate the solenoid valve. The known solenoid valve is closed when without current; its armature can lift a valve closing body up from a valve seat counter to the force of a valve closing spring. If the known solenoid valve were embodied so as to be open when without current, it would be possible for the armature to press the valve closing body against the valve seat counter to the force of a valve opening spring. The valve seat is embodied on a valve seat part, which is disposed flush at an open end of the valve dome.

In order to fasten the solenoid valve in the receiving bore of the hydraulic block, a circular ring-shaped valve support is provided in which the valve dome engages with its open end. The solenoid valve is fastened in the receiving bore of the hydraulic block through the use of a fastening plate which has a hole let into the fastening plate with the diameter of the valve dome and the valve dome is inserted through this hole. The fastening plate is clamped between the valve support and the coil. The fastening plate is affixed to the valve block and secures the solenoid valve to the valve support in the receiving bore.

In order to produce a seal between the valve support and the valve dome, a sealing ring is inserted into a circumferential inner groove in the circular ring-shaped valve support. The seal between the valve support and a wall of the receiving bore is produced by a sealing ring which is inserted into an annular step of the valve support. A sealing ring is also provided to produce a seal between the valve seat part and the receiving bore, and is inserted into a groove running around the circumference of the valve seat part or a valve seat part holder into which the valve seat part is press-fitted. A valve inlet is produced by means of radial bores which are let into the valve support and valve seat part holder and which connect to an end of the valve seat part oriented toward the armature.

The known solenoid valve has the disadvantage that the known solenoid valve is costly to manufacture since both the valve support and the valve seat part holder—with their grooves and steps for the sealing rings and with the lateral bores for the valve inlet—must be expensively produced in a material-cutting fashion and that the fastening plate, which is clamped between the valve support and the coil and must be affixed to the hydraulic block, makes assembly expensive.

ADVANTAGES OF THE INVENTION

The solenoid valve according to the invention, has an advantage that the attachment of the valve dome to the valve support and also the attachment of the valve seat part to the valve dome are achieved in a positively engaging and/or frictionally engaging manner by means of a non-cutting shaping process such as flanging or caulking of the valve support. This kind of connection between the valve dome, the valve seat part, and the valve support also simultaneously produces the seal between these parts without requiring a sealing element. This saves not only the cost of the sealing element, but also the assembly cost for affixing the sealing element. Another advantage of the solenoid valve according to the invention is the possibility of embodying the solenoid valve as compact in the axial direction by virtue of the connection and sealing of the valve dome, the valve seat part, and the valve support.

Advantageous embodiments and modifications of the invention disclosed in herein are the subject of the invention set forth hereinafter In an embodiment of the invention a valve inlet and valve outlet are produced through the open end of the valve dome, for example in an axial or axially parallel fashion. This eliminates the need for the production of a lateral hole in the valve dome, the valve support, the valve seat part, or the valve seat part holder, which constitutes a considerable simplification in the manufacture of the solenoid valve since it is difficult and therefore costly to produce a lateral hole of this kind.

BRIEF DESCRIPTION OF THE DRAWINGS

The invention will be explained in detail below in conjunction with an exemplary embodiment shown in the drawings.

DESCRIPTION OF THE EXEMPLARY EMBODIMENT

Figure 1:
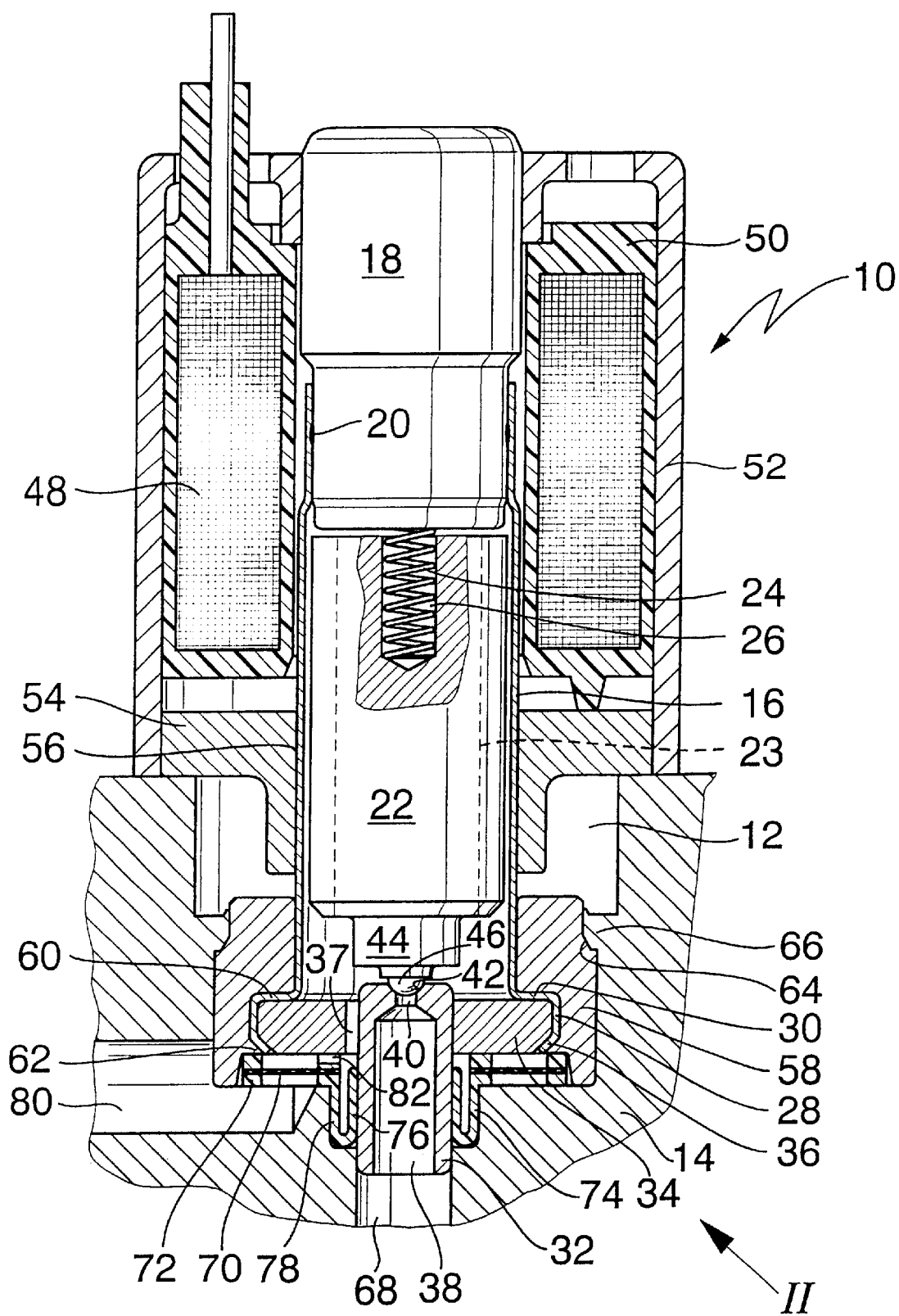
FIG. 1 shows an axial section through a solenoid valve according to the invention.
Figure 2:
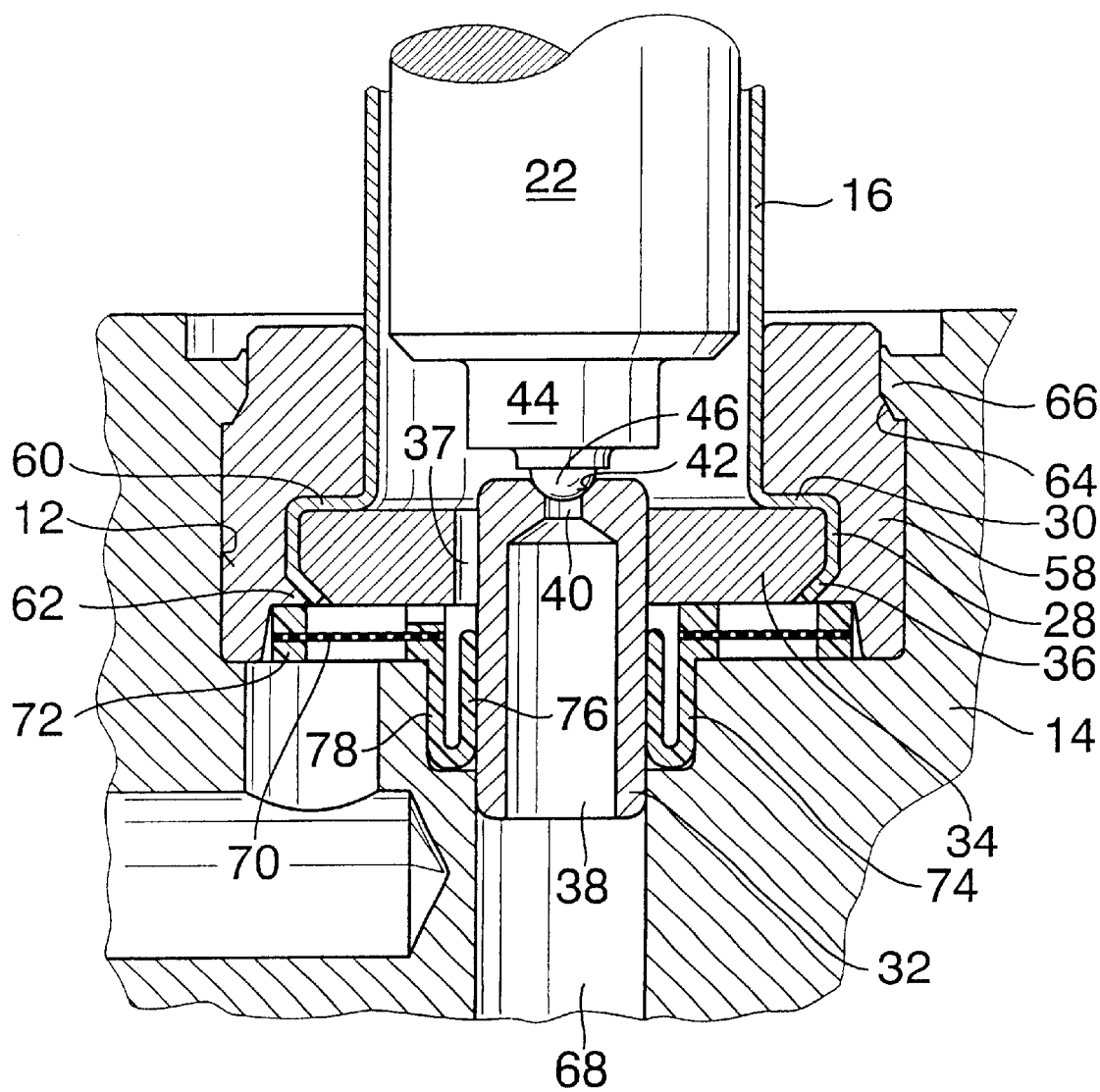
FIG. 2 shows an enlarged detail indicated by the arrow II in FIG. 1.

The solenoid valve 10 according to the invention, which is depicted in the drawings, is a rotationally symmetrical 2/2-way valve that is closed in its currentless normal position. A stepped receiving bore 12 is let into a hydraulic block 14. The hydraulic block 14, of which the drawings only show a fractional means of a circumferential weld 20. Adjacent to the pole 18, a cylindrical armature 22 is contained so that the armature can move axially in the valve dome 16. A valve closing spring 24 in the form of a helical compression spring, which is inserted into an axial blind hole 26 in the armature 22, presses the armature 22 away from the pole 18.

The armature 22 is provided with continuous longitudinal grooves 23 which permit fluid to flow past the armature in order to keep the movement resistance of the armature 22 low when the solenoid valve 10 is actuated.

At another, open end 28 remote from the pole 18, the valve dome 16 widens out with an annular step 30 produced by means of non-cutting shaping. A valve seat part 32 is disposed in the open end 28 of the valve dome 16. The valve seat part 32 is cylindrical and has a considerably smaller diameter than the valve dome 16. This valve seat part 32 is press-fitted into a perforated disc-shaped valve seat part holder 34, which rests in the annular step 30 at the open end 28 of the valve dome 16. A flange 36 directed obliquely inward at the open end 28 of the valve dome 16 secures the valve seat part holder 34 with the valve seat part 32 in the open end 28 of the valve dome 16. The perforated disc-shaped valve seat part holder 34 is an easy-to-manufacture, inexpensive standard part.

The valve seat part 32 is provided with an axial through hole 38 which has a narrow point as a throttle restriction 40 on an end oriented toward the armature 22 and opens out toward the armature 22 with a conical valve seat 42. The through hole 38 with the throttle restriction 40 constitutes a valve outlet.

The valve seat part 32 does not have any undercuts and is manufactured rapidly and inexpensively by means of cold forming, i.e. by means of a non-cutting shaping process. The valve seat 42 can be stamped after the cold forming in order to produce a material hardening and to increase its wear resistance. The valve seat part 32 can also be manufactured of one piece with the valve seat part holder 34.

On its end oriented toward the valve seat part 32, the armature 22 tapers down with two annular steps. As a valve closing body, a hardened ball is press-fitted into the tapered end 44 and cooperates with the valve seat 42. The armature 22, with the valve closing body 46 press-fitted into armature is pressed against the valve seat 42 by the valve closing spring 24, i.e. the solenoid valve 10 is closed in its currentless normal position.

A coil 48 that encompasses the valve dome 16 and the pole 18 is slid onto the solenoid valve 10 in order to open the valve. When the coil 48 is supplied with current, the armature 22 is attracted to the pole 18 counter to the force of the valve closing spring 24 and in this manner, the valve closing body 46 is lifted up from the valve seat 42; the solenoid valve 10 is open in its switched position in which it is supplied with current. The coil 48 is encased in a plastic insulator 50 and inserted into a cup-shaped yoke 52, which closes a magnetic circuit of the solenoid valve 10 at a free end of the pole 18. A yoke disc 54 with a center hole 56 is inserted into an end of the yoke 52 oriented toward the hydraulic block 14 and the valve dome 16 reaches through this center hole. At the end oriented toward the armature 22, the magnetic circuit of the solenoid valve 10 is also closed to a large extent by the yoke disc 54.

At a point on its inner circumference, i.e. on the outer circumference of the valve seat part 32, the perforated disc-shaped valve seat part holder 34 has an axially parallel continuous longitudinal groove 37, which is part of a valve inlet. This longitudinal groove 37 constitutes a throttle restriction. The valve inlet 37 and valve outlet 38, 40 are therefore produced through the open end 28 of the valve dome 16 so that a lateral hole for the valve inlet or outlet no longer has to be produced in the circumference wall of the valve dome 16 or in another part of the solenoid valve 10, which simplifies the manufacture of the solenoid valve 10.

In order to affix the solenoid valve 10 in the receiving bore 12 of the hydraulic block 14, the solenoid valve 10 has a circular ring-shaped valve support 58 which is slid onto the valve dome 16. The valve support 58 has an annular step 60 on its inside in which the annular step 30 of the valve dome 16 rests, with the valve seat part holder 34 inside it. By means of a press-fit between the valve support 58, the broadened end of the valve dome 16, and the valve seat part holder 34, these parts are mechanically connected to one another and sealed in a pressure-tight fashion. There is thus a frictional engagement between the valve support 58, the valve dome 16, and the valve seat part holder 34. The press-fit between the valve dome 16 and the valve seat part holder 34 can be produced by press-fitting the valve support 58 onto the valve dome 16; therefore there does not have to be a press-fit between the valve seat part holder 34 and the valve dome 16 in every case, as long as the valve support 58 has not yet been press-fitted on. A circumferential caulk 62 of the valve support 58 improves the mechanical connection and the pressure-tight seal between the valve support 58, the valve dome 16, and the valve seat part holder 34. The caulk 62 also produces a positive engagement in addition to the frictional engagement.

On its outer circumference, the valve support 58 also has an annular step 64 at which the valve support—and along with the valve support, the entire solenoid valve 10—is secured in the receiving bore 12 of the hydraulic block 14 and sealed in a pressure-tight fashion by means of a circumferential caulk 66 of the hydraulic block 14. The caulk 66 is produced before the coil 48 with the yoke 52 is slid onto the valve dome 16 and the pole 18.

On an end remote from the armature 22, the valve seat part 32 protrudes out of the valve seat part holder 34 into an axial outlet bore 68 in the hydraulic block 14. A filter element 70 is disposed at a bottom of the stepped receiving bore 12, has the form of a perforated disc 70, encompasses the valve seat part 32 protruding from the valve seat part holder 34, and is comprised for example of a woven filter cloth or a perforated filter screen. The filter element 70 is partially extrusion coated with a thermoplastic plastic, which preferably contains approx. 20% glass or carbon fibers. The filter element 70 rests in a flat recess of the valve support 58. The thermoplastic plastic of the filter element 70 fulfills a number of sealing functions: for one thing, the thermoplastic plastic is embodied as a sealing ring 72 on the outer circumference of the filter element 70. The thermoplastic plastic also constitutes an annular sealing element 74 on the inner circumference of the perforated disc-shaped filter element 70. This annular sealing element 74 encompassing the valve seat part 32 has a U-shaped annular cross section whose open end is oriented toward the valve seat part holder 34 and whose closed yoke end is oriented away from the valve seat part holder 34 so that an inner chamber of the U-shaped annular cross section of the sealing element 74 is acted upon with a fluid pressure prevailing in the valve inlet. An inner arm 76 of the U-shaped annular cross section of the sealing element 74 rests in a sealed fashion against the outside of the valve seat part 32 and an outer arm 78 of the U-shaped annular cross section rests in a sealed fashion against the inside of a circumference wall of the stepped receiving bore 12 of the hydraulic block 14. Through the action of the pressure prevailing in the valve inlet, the arms 76, 78 of the sealing element 74 are pressed more strongly against the valve seat part 32 and the receiving bore 12 as the pressure increases so that the sealing action increases and the sealing element 74 produces a reliable seal between the valve inlet and the valve outlet even at high pressure. The valve inlet is produced by means of a radial inlet bore 80 which leads to the filter element 70, on through the filter element 70, and through one or more radial grooves 82 in the sealing element 74, which constitute throttle restrictions, and through the longitudinal groove 37 of the valve seat part holder 34 into the inner chamber of the valve dome 16.

The foregoing relates to a preferred exemplary embodiments of the invention, it being understood that other variants and embodiments thereof are possible within the spirit and scope of the invention, the latter being defined by the appended claims.

We claim:

1. A solenoid valve (10) comprising;
    a circular ring-shaped, valve support (58) free of an undercut, which is inserted into a receiving bore (12) of a hydraulic block (14),
    a valve dome (16) which, with an open end (28) that has an annular step-shaped enlarged section (30), engages with the valve support (58) and is connected to the valve support in a fluid-tight manner by means of a frictional engagement and/or a positive engagement,
    an armature (22) which is contained so that the armature moves axially in the valve dome (16),
    a coil (48) which is placed onto the valve dome (16) so that the coil encompasses the valve dome (16),
    a valve closing body (46), which is lifted up from a valve seat (42) by the armature (22) in order to open the solenoid valve (10) and/or is pressed against the valve seat (42) by the armature (22) in order to close the solenoid valve (10), and the valve seat (42) is embodied on a valve seat part (32) which is affixed to the valve support (58), the annular step-shaped enlarged section (30), rests in a complementary enlarged section (60) in the valve support (58),
    the valve seat part (32) is contained in the annular step-shaped enlarged section (30) of the valve dome (16),
    and that the valve dome (16) and the valve seat part (32) are connected to the valve support (58) in a fluid-tight fashion by means of a non-cutting shaping of the valve support (58).

2. The solenoid valve according to claim 1, wherein the valve seat part (32) is secured in a fluid-tight fashion in the valve dome (16) inside the valve support (58) by means of a positive engagement and/or frictional engagement.

3. The solenoid valve according to claim 1, wherein the valve seat part (32) is an essentially hollow cylindrical part which is inserted into the holder (34), the holder (34) being a perforated disc-shaped valve seat part holder (34), which is secured in a fluid-tight fashion in the valve dome (16) inside the valve support (58) by means of a positive engagement and/or frictional engagement.

4. The solenoid valve according to claim 2, wherein the valve seat part (32) is an essentially hollow cylindrical part which is inserted into the holder (34), the holder (34) being a perforated disc-shaped valve seat part holder (34), which is secured in a fluid-tight fashion in the valve dome (16) inside the valve support (58) by means of a positive engagement and/or frictional engagement.

5. The solenoid valve according to claim 1, in which a valve inlet (37) and valve outlet (38, 40) are disposed in the open end (28) of the valve dome (16).

6. A solenoid valve according to claim 1, in which the solenoid valve (10) has an annular seal (74) which encompasses the valve seat part (32) and produces a seal between the valve seat part (32) and the receiving bore (12) in the hydraulic block (14), and that the seal (74) has a U-shaped annular cross section, an inner arm (76) of the U-shaped annular cross section rests in a sealed fashion against the valve seat part (32) and an outer arm (78) of the U-shaped annular cross section rests in a sealed fashion against a circumference wall of the receiving bore (12) in the hydraulic block (14).

7. The solenoid valve according to claim 6, in which an annular chamber between the arms (76, 78) of the U-shaped cross section communicates with the valve inlet (37, 80, 82).

8. The solenoid valve according to claim 6, in which the seal (74) is of one piece with a filter element (70).

9. The solenoid valve according to claim 8, in which the filter element (70) has an additional seal (72) which produces a seal between the valve support (58) and the receiving bore (12) in the hydraulic block (14).

10. The solenoid valve according to claim 7, in which the seal (74) is of one piece with a filter element (70).

11. The solenoid valve according to claim 10, in which the filter element (70) has an additional seal (72) which produces a seal between the valve support (58) and the receiving bore (12) in the hydraulic block (14).

* * * * *